INVENTOR.
RAYMOND E. MICHEL

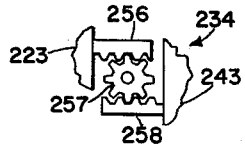
Fig. 3
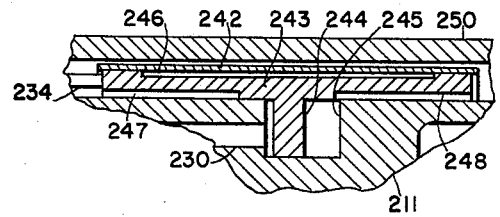
Fig. 4
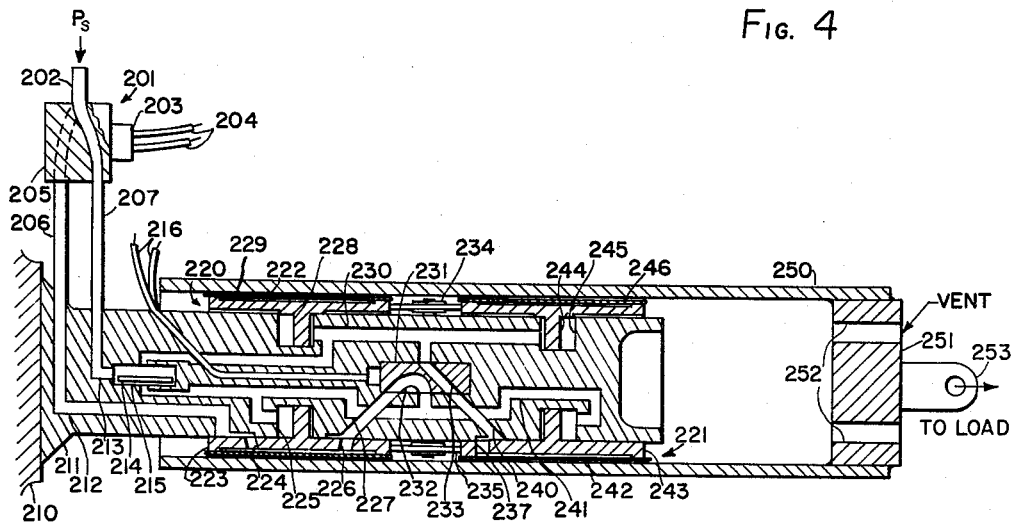
Fig. 2
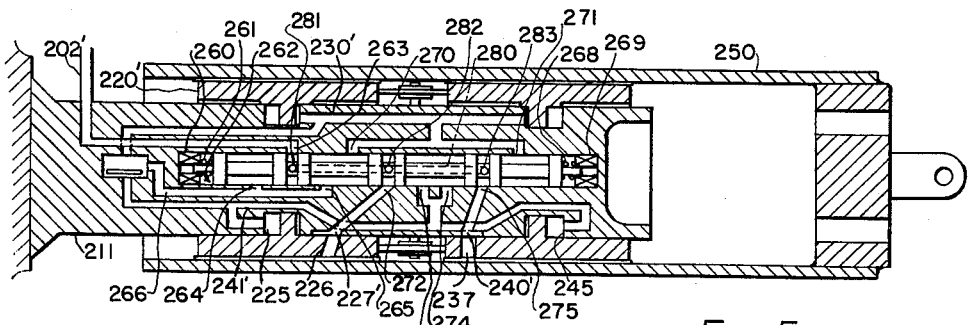
Fig. 5
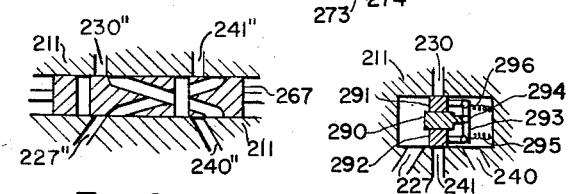
Fig. 6
Fig. 7
INVENTOR.
RAYMOND E. MICHEL March 26, 1963 R. E. MICHEL 3,082,743
CONTROL APPARATUS
Filed Aug. 17, 1959 4 Sheets-Sheet 3

INVENTOR.
RAYMOND E. MICHEL
BY *Vernon A. Johnson*

March 26, 1963   R. E. MICHEL   3,082,743
CONTROL APPARATUS
Filed Aug. 17, 1959   4 Sheets-Sheet 4

INVENTOR.
RAYMOND E. MICHEL
BY Vernon A. Johnson

United States Patent Office 3,082,743
Patented Mar. 26, 1963

3,082,743
CONTROL APPARATUS
Raymond E. Michel, Minneapolis, Minn., assignor to Minneapolis-Honeywell Regulator Company, Minneapolis, Minn., a corporation of Delaware
Filed Aug. 17, 1959, Ser. No. 834,347
28 Claims. (Cl. 121—38)

This invention relates to fluid pressure actuators, and, more particularly, to actuators utilizing a compressible fluid such as air to achieve an output force.

Fluid pressure actuators, particularly of the pneumatic type, are subject to sudden force applications upon the work arm or member to be actuated, and sometimes act with percussive or hammer-like result. The action starts suddenly and is likely to exceed the exact movement desired because of the expansive and compressible nature of the fluid medium. The principle fault with such devices resides in the fact that suitable stability control has not been provided.

The primary cause of this uncontrolled jump and instability that occurs in a pneumatic actuator and, particularly an actuator that must operate through a relatively long range or displacement, is the fact that air has a low bulk modulus, or spring rate. Thus, the stored energy for a given load is high compared to a high bulk modulus fluid such as conventional hydraulic fluid. As the volume of pressurized air is reduced, these uncontrolled jump and instability effects are also reduced, since the total available stored energy is reduced and the stability and positional output accuracy approaches that of a hydraulic servo actuator. As a result of these conditions, it has been necessary in the past to equip long displacement pneumatic actuators with fairly complex and expensive damping and locking devices in order to achieve satisfactory operation.

My invention discloses a pneumatic actuator that provides long range or displacement action without the use of special damping or locking devices, and which is not subject to the uncontrolled jump and instability normally associated with such devices. I accomplish this by utilizing a very small volume of compressed air to drive the actuator ram through successive short-strokes to achieve the long-range output.

Thus, it is a primary object of my invention to provide an improved fluid operated actuator that is of relatively simple construction and low in cost, and which utilizes a compressible fluid to achieve high stiffness with a long-range piston-cylinder output.

A further object of my invention is to provide such an improved fluid operated actuator in which a long-stroke output is achieved by a series of short-stroke movements.

These and other objects of my invention will become apparent from the following description of a preferred form thereof and the four sheets of drawings illustrating the invention, in which:

FIGURE 2 is a cross-sectional view of a double acting actuator with a rigid supply line;

FIGURE 3 shows the rack and pinion gear configuration used in FIGURE 2;

FIGURE 4 is a cross-sectional view of the brake and piston used in the actuator of FIGURE 2;

FIGURE 5 is a cross-sectional view of a modified form of the double acting actuator shown in FIGURE 2;

FIGURE 6 is a cross-sectional view of a modified cross-over valve for use in a modified form of the double acting actuator shown in FIGURE 2;

FIGURE 7 is a cross-sectional view of an alternate form of cross-over valve for use in the double acting actuator of FIGURE 2;

*General Operation*

Figure 1:
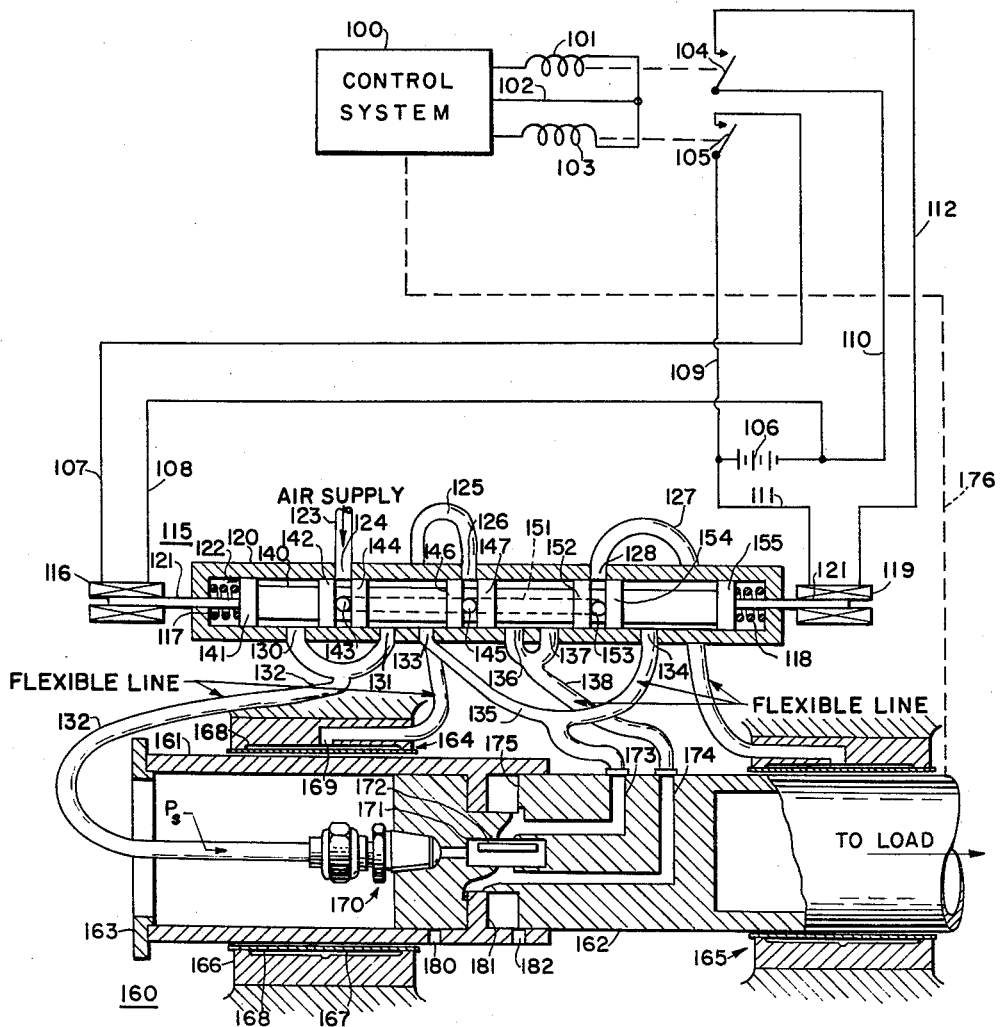
FIGURE 1 is a schematic diagram of a complete control system, in which a control valve is connected to a single-acting actuator by means of flexible lines.

The operation of my actuator will be best understood by reference to a specific embodiment thereof. In FIGURE 1, a valving device 115 is combined with a single acting actuating mechanism 160 to move the load (not shown) at the right end of actuator ram 162. During operation of my actuator, supply air is received in flexible line 132 and transmitted through nozzle 170 to flapper valve chamber 171. The flapper valve, depending upon the position of flapper 172, causes supply pressure to be directed against one side of piston flange 181 of cylinder 161, and simultaneously causes air pressure to flow over flexible lines 135 or 138 to valving device 115, and from there to rear brake 164 or forward brake 165, depending on the position of spool 122. The sudden release of air through exhaust ports 180 or 182 at the end of a short-stroke movement, causes a sudden flow of air past the flapper 172 resulting in a reduced pressure and thereby moves the free-moving flapper to the opposite wall of the flapper valve chamber. This back and forth movement of the flapper 172 causes braking members 165 and 164 to be alternately operated, and cylinder 161 and actuator ram 162 are thereby alternately moved in the same longitudinal direction to thereby move the load in one direction or the other.

*Detailed Description*

A clearer understanding of this device, and the operation thereof, will be achieved by reference to the following detailed description. In FIGURE 1, a complete system is shown, including a control system 100 which controls valving device 115 to thereby achieve either forward or reverse movement of actuator ram 162. When movement of actuator ram 162 to the right, or forward, is called for, control system 100 is effective to complete a circuit through relay coil 101 and lead 102, to thereby energize relay coil 101. This completes a circuit including battery 106, lead 110, contacts 104, lead 112, coil 119, and lead 111, to thereby energize coil 119 and force spool 122 to the right against the force of centering spring 118. On the other hand, when a movement to the left is called for control system 100 completes a circuit over lead 102 to energize relay coil 103, and thereby close contact 105. When contact 105 is closed, a circuit is completed including lead 107, contact 105, lead 109, battery 106, lead 108, and coil 116, and coil 116 is energized to force spool valve 122 to the left against the force of centering spring 117. When the load has been moved to the desired position, feedback linkage 176 coupling actuator ram 162 to control system 100 is effective to balance the control system, and thereby terminate operation of relay 101 or 103, as the case may be, to thereby re-center spool 122 and terminate movement of actuator ram 162. Since the actual control system and feedback means comprise no part of this invention, I have merely shown these items schematically and it should be understood that any suitable system embodying these items could be used to achieve these purposes. Furthermore, although I have shown the power supply for coils 116 and 119 as a D.C. battery 106, it should be understood that any suitable power means could be used for this purpose.

Valving device 115 consists of a cylinder 120, and a spool 122 that is moved within said cylinder 120 by a force on shaft 121 due to the energization of coils 116 and 119 as described above. Cylinder 120 is provided with ports 124, 126, 128, 130, 131, 133, 136, 137, and 134, these ports being connected to communicate with the various flexible air lines 123, 125, 127, 132, 135, and 138 as shown. Supply pressure is received over line 123, from any suitable air pressure source such as a compressor. This air pressure is used to control actuating mechanism 160, depending upon the position of lands 141, 142, 144, 146, 147, 152, 154, and 155 on shaft 140 of spool 122. The spool is shown in its center, or off, position, this position being maintained by centering springs 117 and 118. In this off position, air pressure in line 123 is blocked from ports 130 and 131 by lands 142 and 144, respectively, and there is therefore no supply pressure transmitted over flexible line 132 to nozzle 170. Air pressure is directed, however, through port 143 in shaft 140, and through bore 151 to ports 145 and 153. This pressure is therefore directed through flexible lines 125 and 127, respectively, to rear brake 164 and forward brake 165, thereby holding actuator ram 162 in a fixed position with respect to the load that it is controlling.

When coil 119 is energized, moving spool 122 to the right, port 124 is opened to communicate with port 130, port 126 with port 133, and port 127 with port 137, and ports 143, 131, 145, 136, 153 and 134 are then blocked by spool 122. Thus, air pressure in line 123 is transmitted over flexible line 132 to the flapper valve chamber 171; rear brake 164 is connected by flexible line 125 to flexible line 135, air passage 173 and the exhaust port at the upper wall of the flapper valve chamber 171; and forward brake 165 is connected by flexible line 127 to flexible line 138, air passage 174 and the exhaust port at the bottom of flapper valve chamber 171.

If, instead of energizing coil 119, I energize coil 116, spool 122 moves to the left. In that case, line 123 is connected to line 132 through ports 124 and 131, line 125 is connected to line 138 through ports 126 and 136, and line 127 is connected to line 135 through ports 128 and 134. Ports 130, 143, 133, 137, 145 and 153 are then blocked by spool 122. In this case, it is seen that air pressure is directed to the flapper valve chamber as described in the above paragraph, but the brake and flapper valve lines have been reversed so that line 125 to rear brake 164 is now connected to the bottom of flapper valve chamber 171, and line 127 to forward brake 165 is now connected to the top of flapper valve chamber 171. This reversal, as will now become apparent, causes actuator ram 162 to be longitudinally moved to the left, or retracted.

Cylinder 161 has a generally tubular shape as shown, with a ring-shaped flange 181 integrally formed at the inner wall thereof, and is provided with two exhaust ports 180 and 182. End stop member 163 is mounted at the outer end of cylinder 161 by screws or other suitable mounting means (not shown).

Brakes 164 and 165 are identical in structure, although slightly different in diameter. These brakes consist of two cylindrical members such as 166 and 167 mounted concentric to each other, member 166 being shaped to provide a space 168 therebetween. Member 166 is securely attached at its outer periphery to the supporting structure. Members 166 and 167 are securely attached along their respective outer edges by welding or other suitable means, so that there is no air leakage when the chamber 168 is pressurized. Member 167 is comparatively thin, and is of such a diameter as to engage the outer wall of cylinder 161 with a close, sliding fit. When the pressure is received over line 125, it is transmitted through air passage 169 to chamber 168, and the thin member 167 is thereby deformed into tight contact with cylinder 161, and is effectively connected thereto by the resulting frictional forces. Thus, when air is supplied under pressure to the brake, a positive braking of clutching action is achieved.

Actuator ram 162 is preferably formed to have a tubular section at the right end for connection to the load, with a solid cylindrical portion at the left end. Said solid portion of actuator ram 162 is formed with a flapper valve or disk valve chamber 171; with air passages 173 and 174 which communicate, respectively, with the top and the bottom exhaust ports of flapper valve chamber 171; and with a circular groove 175 which co-acts with the inner wall 181 of cylinder 161 to form a piston chamber. A free two position disk valve 172 which is of circular shape coacts with said ports. While it is a two position valve, for clarity it is shown in FIGURE 1 slightly displaced from one such position.

In order to describe the operation of my actuating mechanism 160, I will assume that coil 119 of valving means 115 has just been energized, and that the flapper 172 is in the position shown when the air pressure is initially transmitted through flexible line 132 to nozzle 170. Air pressure is then directed through the exhaust port at the bottom of flapper valve chamber 171, through air passage 174, flexible line 138, port 137, port 128, and flexible line 127 to forward brake 165, thereby preventing actuator ram 162 from moving. Simultaneously, pressure is directed to the left side of cylindrical groove 175, thereby impinging on the left wall of flange 181 to thereby move cylinder 161 to the right and isolating groove 175 from port 182. It should be noted that rear brake 164 is not pressurized at this time, so that it does not impose any restraint on the movement of cylinder 161. When flange 181 on further movement of cylinder 161 comes in close proximity with the right wall of cylindrical groove 175, the pressurized piston-chamber defined by circular groove 175 and the inner wall of the cylinder 161 is opened to the atmosphere by exhaust port 180. When this occurs, there is a sudden decrease in pressure in flapper valve chamber 171, and a sudden flow of air past the bottom side of flapper or disk 172, so that the relative pressure is greater at the top of flapper 172 than at the bottom, due to the Bernoulli effect. This pressure differential is made greater by the fact that a slight increase in pressure is experienced at the top of flapper 172 due to the increased pressure between the right wall of flange 181 and the right wall of groove 175 due to isolation of groove 175 from port 182 as stated. This slight increase in pressure thus serves to not only aid in producing flapper action, but also cushions the stepping action of the actuator.

When this pressure differential between the top and bottom of flapper or disk 172 is experienced, the flapper 172 is caused to move to the bottom of the valve chamber, thereby closing air passage 174 and opening air passage 173. It should be remembered that when exhaust port 180 was opened to groove 175, the pressure was removed from brake 165 so as to terminate the braking action. Now, with pressure flowing from flexible line 132 through passage 173 and flexible line 135, this pressure is directed through ports 136 and 126 of valving device 115 to flexible line 125 and air passage 169 in rear brake 164. Chamber 168 in the rear brake is then pressurized, to prevent movement of cylinder 161 during this half cycle of the operation. Pressure is simultaneously applied to the right wall of flange 181, so as to force actuator ram 162 to the right against the load. When flange 181 approaches the left wall of the circular groove 175, said groove is opened to the atmosphere through exhaust port 182. When this occurs, flapper 172 is again moved, due to the above described differential pressure operation, to the position shown in FIGURE 1, and the cycle starts again. Thus, there is a continuous pecking or stepping action so as to move actuator ram 162 and cylinder 161 to the right in alternate short-stroke steps, so long as air pressure is supplied to flapper valve chamber 171, thereby achieving a long stroke single-acting movement of actuator ram 162.

When the desired position of ram 162 is achieved, as indicated by feedback linkage 176, control system 100 is effective to deenergize coil 101 and thereby simultaneously deenergize 119, whereby spool 122 is centered under the control of centering springs 117 and 118. Supply pressure is then removed from the flapper valve chamber although it is directed to the two brakes so as to hold the actuator ram in the desired position. When reverse movement of the actuator ram is desired, coil 103 is energized to close contact 105, which in turn energizes relay 116 to thereby move spool 122 to the left. Air pressure is then supplied to flapper valve chamber 171 in the manner described above, but the direction of the movement of actuator ram 162 is reversed since brakes 164 and 165 are operated in reverse. More particularly, rear brake 164 is engaged when pressure is supplied to the left side of groove 175, and right brake 165 is engaged when pressure is supplied to the right side of grove 175. It is therefore apparent that actuator ram 162 is stepped to the left, as is desired.

In FIGURE 2, I have shown the principles of my actuating mechanism in a modified form so as to achieve double acting movement of the actuator ram or load, i.e., movement in the desired direction during each position movement of the disk valve or during each half cycle of the flapper valve operation. In FIGURE 2, a two position control valve 201 is connected by means of air lines 206 and 207 to the actuating mechanism. This mechanism consists of an actuator body or support member 211 that is securely attached to supporting structure 210 by any suitable means (not shown), an actuator ram 250 that is provided with a member 253 for connection to the load (not shown), and a pair of piston-brakes 220 and 221. Two-position valve 201 consists of a valve body 205, said body being ported to receive supply pressure line 202 and two output pressure lines 206 and 207. As shown, line 202 is connected to line 207. A control device 203 is shown connected to body 205, control device 203 being controlled by a pair of control wires 204. Although these elements are shown schematically, it should be understood that control device 203 could be a solenoid operated valve, under the control of a circuit at leads 204, operation of control device 203 being effective to transfer supply line 202 from line 207 to line 206. Numerous configurations of a two-position control valve could be used as device 201, a typical example being shown in FIGURE 14 and described in connection therewith.

Actuator body 211 is provided with numerous ports and air passages, a flapper valve chamber 215 of the type described in FIGURE 1 and comprising a flapper 214, and a cross-over or reversing valve 231 which is effective in the configuration of FIGURE 2 to cause direction reversal of the actuator ram 250. Air passage 213 connects pressure line 207 with the inlet port of the flapper valve chamber 215; air passage 212 connects pressure line 206 with port 224 in piston-brake 220; air passage 230 connects the upper exhaust port of flapper valve chamber 215 to the right wall of circular groove 225 in valve body 211; air passage 241 connects the lower exhaust port of flapper valve chamber 215 to the left vertical wall of circular groove 225, to a port at the bottom center of cross-over valve 231, and to the right vertical wall of groove 245; air passage 227 connects port 226 in piston-brake 220 to cross-over valve 231 as shown; and air passage 240 connects port 237 in piston-brake 221 to the cross-over valve as shown. Actuator ram 250 consists of a length of tubing as shown, with an enclosure member 251 mounted at the right end by any suitable means (not shown). Enclosure member 251 is provided with ports 252 to prevent the development of any pressure in the chamber defined by actuator body 211, actuator ram 250, and enclosure member 251. Flange 253 is formed as an integral part of enclosure member 251 and provides convenient means for connecting the actuator ram to the load (not shown).

Piston-brakes 220 and 221 provide the driving force for moving actuator ram 250, and also provide the necessary braking or clutching means for coupling the driving force of the piston to actuator ram 250. Piston-brakes 220 and 221 are very similar in construction, and will be best understood by reference to FIGURE 4 showing an enlarged cross-sectional view of piston-brake 221. Piston-brake 221 consists of two concentrically arranged sleeves 242 and 243, welded at their outer edges to form a circular air chamber 246 therebetween. Inner sleeve 243 is formed with an integral ring-shaped flange 244 depending from its inner wall as shown, with two exhaust ports 247 and 248 which will be more clearly seen in FIGURE 4 and associated description, and with a brake-port 237 which connects air chamber 246 to air passage 240. Flange 244 is formed so that there is a very close sliding fit between the bottom of circular groove 245 and the inner annular surface of said flange. During operation, pressure in passage 230 impinges on the left vertical wall or face of flange 244 so as to force piston brake 221 to the right with respect to actuator body 211, whereas pressure in passage 241 bears on the right face of flange 244 and forces piston-brake 221 to the left with respect to actuator body 211. Furthermore, pressure in chamber 246 deforms flexible sleeve 242 against the inner wall of actuator ram 250, thereby clutching piston-brake 220 to said actuator ram 250. Piston-brake 220 is very similar to piston-brake 221, and consists of two concentrically mounted sleeves 222 and 223, sleeve 223 being formed so that a pressure chamber 229 is formed therebetween when the sleeves are welded at their outer edges. Integral flange 228 on sleeve 223 engages the bottom of circular groove 225 in a close sliding fit. Pressure ports 224 and 226 connect air chamber 229 to air-passages 212 and 237, respectively.

Piston-brakes 220 and 221 are mechanically coupled by rack-and-pinion mechanisms 234 and 235, these mechanisms being identical. Top view of mechanism 234 is shown in FIGURE 3, and consists of an idler gear or pinion 257 which is rotatably mounted at its center to valve body 211, and two drive-bars or racks 256 and 258 connected to sleeves 223 and 243, respectively. These idler gear assemblies keep piston-brake 220 and piston-brake 221 moving in synchronism, and effectively double the driving force on actuator ram 250 as will become clearer in the following description.

Figure 11:
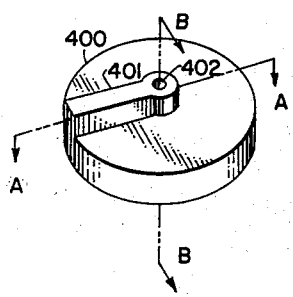
FIGURES 11 through 13 show a pneumatically operated cross-over valve, and various cross-sectional views thereof.
Figure 12:
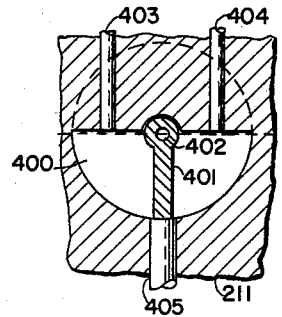
Figure 13:
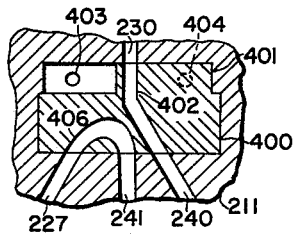

Cross-over valve 231 is controlled by an electrical source (not shown) and leads 216, or may be controlled pneumatically as is shown in FIGURES 11 through 13. This is preferably a three position valve, and is shown in the position that provides forward motion of actuator ram 250. Rotation of cross-over valve 231 about a vertical axis in FIGURE 2 through 180 degrees whereby passage 232 is connected to passage 240, and passage 233 is connected to passage 227, causes ram 250 to retract, or move to the left. A center or off position should also be provided, in which case passages 227 and 240 are blocked by the valve body 231. Rotation of cross-over valve 231 may be achieved electrically or pneumatically, by any suitable means, rotation by electrical means being preferably provided by a well-known rotary solenoid, and rotation by pneumatic means being preferably achieved by means of the device shown in FIGURES 11 through 13.

The operation of the actuator mechanism shown in FIGURE 2 is much the same as that of the mechanism in FIGURE 1, except that I achieve certain advantages with the modifications shown in FIGURE 2. The structure of FIGURE 2 makes it possible to eliminate the flexible air lines shown in FIGURE 1, the actuator mechanism is double acting since motion is imparted to the actuator-ram during each half cycle of the operation of flapper 214, and a greater driving force is achieved through use of two piston-brakes and the resultant doubling of piston area. With the three valves 201, 214, and 231 in the positions shown, pressure in line 202 is transmitted to air passage 230 and pressure is thereby built up to the right of flange 228 in groove 225, to the left of flange 244 in groove 245, and in pressure chamber 246 of piston-brake 221 by way of air passages 233 and 240, and port 237. The pressure on flange 228 moves piston-brake 220 to the left, thereby rotating idler-gear 257 and driving bar 258 to the right. At the same time, piston-brake 221 is moved to the right, and thereby carries actuator-ram 250 to the right since piston-brake 221 is effectively connected to actuator ram 250 by pressurization of chamber 246. When the two piston-brakes have moved so that the right wall of flange 244 is in close proximity to the right vertical wall of groove 245, and the left wall of flange 228 is in close proximity to the left vertical wall of groove 225, the chambers at the left of flange 244 and the right of flange 228 are opened to the atmosphere through their respective exhaust ports. This causes operation of the flapper valve in the manner described in connection with FIGURE 1 above, so that flapper 214 is moved up to block the upper exhaust port. Passage 241 is thereby pressurized and pressure in line 202 is directed against the left wall of flange 228, the right wall of flange 244, and pressure chamber 229 of piston-brake 220 by means of passages 232 and 227, and port 226. It should be noted that line 206 is now blocked at the two-position control valve 201 to prevent escape of air through ports 224 and passage 212. Thus, as piston-brake 220 is driven to the right by the air pressure in passage 241, actuator ram 250 is carried to the right through the action of braking member 222, and the driving force which moves piston-brake 221 to the left is transmitted through the rack-and-pinion mechanism to piston-brake 220 so as to effectively double the driving force, and maintain synchronous operation of the two piston-brakes. Actuator-ram 250 is thereby moved to the right during this second half cycle of flapper valve 215, and the next half cycle begins when the exhaust ports such as 248 communicate with their respective pressure chambers and exhaust the air pressure through to the atmosphere.

It is apparent that rotation of cross-over valve 231 through a half circle will cause passage 233 to communicate with passage 227 and passage 232 to communicate with passage 244, and analysis of the over-all mechanism on that basis readily indicates that actuator ram 250 is stepped to the left, or retracted, under the influence of supply pressure in line 202. In order to hold actuator ram 250 in any given position, two position valve 201 should be operated simultaneously with the movement of cross-over valve 231 to its off position as described above. In that case, line 207 is closed at the two position valve, and line 202 is connected to line 206 whereby pressure is ported to pressure chamber 229 thereby causing cylinder 222 to be forced against the inner wall of actuator ram 250.

In FIGURES 5, 6, and 7, alternate cross-over valve configurations are shown. In these three configurations, the cross-over operation is achieved by means of sliding devices rather than a rotating device, but the over-all operation of the actuating mechanism remains the same.

In FIGURE 5, for example, the basic actuator body, piston-brake, actuator-ram structure is modified to accommodate a solenoid operated, spool-type cross-over valve. Air passage 230 shown in FIGURE 2 is modified to the configuration 230' shown in FIGURE 5, whereby passage 230' is arranged to communicate with the sliding cross-over valve at the two ports 270 and 271 as shown. Similarly, passage 241 of FIGURE 2 has been modified to the 241' configuration shown in FIGURE 5, whereby air is directed to ports 273 and 274, as shown. Passages 227 and 240 of FIGURE 2 are modified to the 227' and 240' configurations, respectively, shown in FIGURE 5, whereby brakes 220 and 221 communicate with ports 272 and 275, respectively, in the valve spool 262 solenoids 260 and 269 control operation of this spool 262 by means of a control circuit (not shown), and centering springs 261 and 268 hold the valve in the neutral position shown until one of the two solenoids 260 or 269 is energized. Spool 262 is provided with a number of lands and is identical to the spool 122 in FIGURE 1 and described in connection therewith. Thus, with the spool 262 centered as shown, supply pressure line 202' communicates with port 281, and supply pressure is carried through bore 280 to ports 282 and 283. This energizes both brakes, and effectively holds the actuator ram 250 in a given position.

When coil 269 is energized, spool 262 is moved to the right against the force of spring 268, causing fluid connections between ports 263 and 264, 270 and 272, and 274 and 275. The lands or spool 262 block ports 281, 265, 282, 273 and 271. In this position supply pressure is directed through passage 266 to the flapper valve, and the cross-over valve is effective to cause actuator ram 250 to be retracted under the influence of said supply pressure.

When cross-over valve body 262 is moved to the left under the influence of solenoid 260, ports 264, 281, 270, 282, 274 and 283 are blocked and fluid connections are established between ports 263 and 265, 272 and 273, and 271 and 275. Air pressure in line 202' is then effective to move actuator ram 250 to the right. It should be noted that in this configuration, as compared to FIGURE 2, I have been able to eliminate two-position valve 201, and one of the braking ports in piston-brake 220.

In FIGURE 6, I have shown a solenoid operated sliding type cross-over valve suitable for use in FIGURE 2 in place of the cross-over valve shown therein. In this case, a two-position valve such as 201 is required, and passages 230, 241, 227, and 240 are modified to the 230", 241", 227", and 240" configurations shown in FIGURE 6. hese passages are generally the same as those shown in FIGURE 2, except that passage 241" is extended to provide a port at the top of sliding member 267, rather than the bottom of the valving device as shown in FIGURE 2. In FIGURE 6, the sliding type cross-over valve is shown in the "Off" position, with passages 230", 241", 227", and 240" closed. When the sliding valve 267, moves to the left under the influence of solenoid operating means (not shown) passages 230" and 240", and passages 241" and 227", are connected through the crossed ports and the actuator ram 250 moves to the right in the manner described above; and when the sliding valve 267, is moved to the right so as to connect passages 230" and 227" and 240", actuator ram 250 moves to the left. When the cross-over valve as shown in FIGURE 6 is used, it is also necessary to use a two-position control valve of the type shown in FIGURE 2 (item 201), in combination with a second braking port, as shown in piston-brake 220, in order to prevent movement of actuator-ram 250 when the cross-over valve is in said "off" position.

In FIGURE 7, I have shown another alternate cross-over valve mechanism, this valve being arranged for direct replacement of the rotating cross-over valve shown in FIGURE 2. In this case, actuator body 211 is formed with a land 290, and slidable members 291 and 292 are normally positioned as shown under the influence of springs 296 and 295 to hold passages 230 and 241 closed. Bell-crank 293 is pinned at point 294 and the two slidable members 291 and 292 are connected thereto as shown. When a clockwise rotating force is applied at point 294 by some type of mechanical input device (not shown) slidable member 291 moves clockwise to the right and slidable member 292 to the left, thereby connecting passages 230 and 227, and passages 241 and 240, to cause retraction of actuator-ram 250. Similarly, if counter-clockwise force is applied at point 294, passage 230 is connected to passages 240, and passages 227 communicates with passage 241, thereby driving actuator ram 250 to the right.

Figure 8:
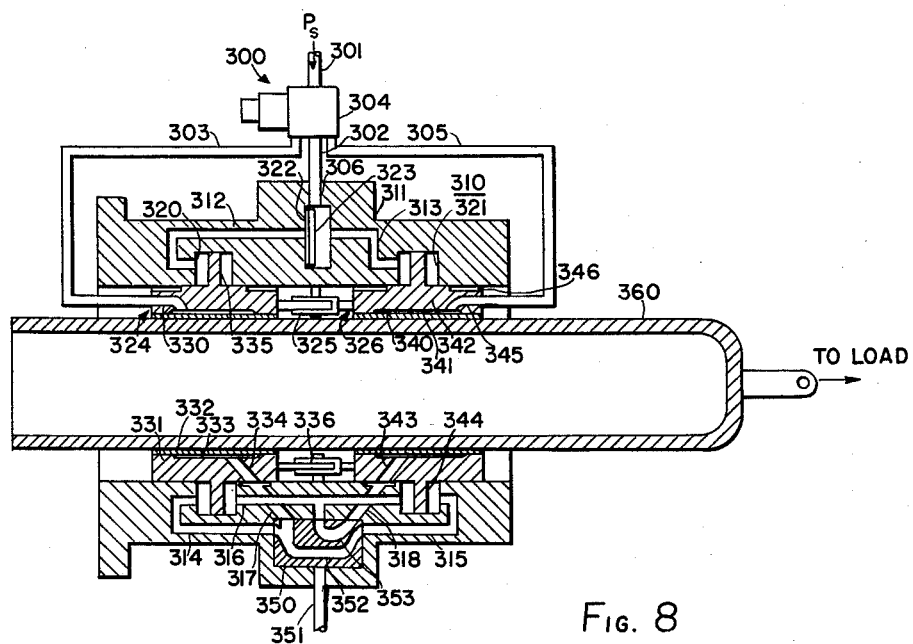
FIGURE 8 is a cross-sectional view of an improved form of my double acting actuator where in a simple, cylindrical actuator ram is used.

FIGURE 8 is a cross sectional view of another alternate construction of my actuating mechanism. The operation of this mechanism is essentially the same as the operation of the configurations shown in FIGURES 1, 2, and 5, and, more particularly, like that of FIGURE 2. However, in the arrangement of FIGURE 8, I have achieved greater simplicity and minimized the problems of maintenance. In this case, actuator ram 360 is merely a tubular member with a load holding member at one end, and can be of any length necessary for a particular purpose. The flapper valve chamber 322 and the cross-over valve 350 are located to the outside of the mechanism, so as to be readily excessible for maintenance and replacement. The piston-brakes 224 and 226 are identical, and merely reversed during the assembly of the device.

Figure 14:
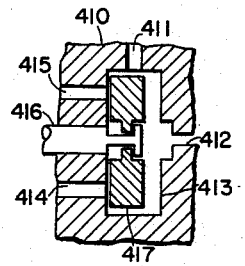
FIGURE 14 is a cross-sectional view of a typical two position control valve as used in conection with the actuators of FIGURES 2 and 8.

In FIGURE 8, a two position control valve 300 is provided that is very similar to the control valve 201 shown in FIGURE 2, and the more specific configuration thereof shown in FIGURE 14. Pressure is directed to this valve through line 301, and valve 300 is effective during operation of the mechanism to connect line 301 with line 302, while blocking flexible lines 303 and 305. This is accomplished by mechanism 304, which operates similar to the mechanism 201 described in connection with FIGURE 2, and in the manner described below in connection with FIGURE 14.

When the actuating mechanism is not to be operated, and is to be locked in a given position, valve 304 is effective to connect lines 303 and 305 to line 301. While closing line 302. Pressure is thereby directed to the braking portion of both piston-brake members 324 and 326, thereby holding actuator ram 360 in a prescribed position.

Actuator mechanism 310 consists of an actuator body 311, an actuator ram 360, two piston-brakes 324 and 326, and two rack-and-pinion assemblies 325 and 336 of the type shown in FIGURE 3. Actuator-body 311 surrounds a portion actuator ram 360, and is securely attached to a supporting structure (not shown). Actuator body 311 is formed with a number of air passages including passage 306 which connects air line 302 to the inlet port of flapper valve chamber 322; passage 312 which connects the left exhaust port of flapper valve chamber 322 to the left wall of circular groove 320; passage 313 which connects the right exhaust port of flapper valve 322 with the left wall of circular groove 321; passage 314 which connects the left wall of circular groove 320 to cross-over valve 350; passage 315 which connects the right wall of circular groove 321 to cross-over valve 350; passage 316 which connects the right wall of circular groove 320 to cross-over valve 350 and to the left wall of circular groove 321; passage 317 which connects piston-brake 324 to cross-over valve 350; and passage 318 which connects piston-brake 326 to cross-over valve 350.

Piston-brake 324, which is shown more clearly in FIGURE 15 to be described below, includes concentrically arranged sleeves 331 and 332 welded at the edges, sleeve 331 being shaped to form a circular pressure chamber 333 between sleeves 331 and 332. Sleeve 331 is formed with an integral ring-shaped flange 335, the outer edge of said flange being arranged to engage the bottom of groove 320 with a close, sliding fit. Sleeve 331 is also formed with two ports to pressure chamber 333, including port 330 which connects said pressure chamber to line 303, and port 334 which connects said pressure chamber to passage 317.

Piston-brake 326 also consists of two concentrically mounted sleeves, welded at the edges, numbered 340 and 342, these sleeves being formed to provide pressure chamber 341 therebetween. Circular groove 321 in actuator body 311 receives ring-shaped flange 344, which is an integral part of sleeve 342, and ports 345 and 343 communicate with air line 305 and passage 318, respectively. Exhaust port 346 is indicated, this port being provided to duplicate the function of port 248 shown in FIGURE 4, and described in connection therewith. It should be noted that a similar exhaust port is provided at the opposite edge of sleeve 342, and at both edges of sleeve 331.

The cross-over valve shown in FIGURE 8 includes valve body 350, and is rotated by shaft 351 which extends to the outside of actuator body 311. Any convenient means for turning this shaft can be used, it being desirable that three positions be provided, the center or "off" position being effective to block the valve passages 352 and 353.

The operation of the mechanism shown in FIGURE 8 is almost identical to the operation of the FIGURE 2 mechanism, and a detailed analysis is not believed to be necessary. It should suffice to point out that with cross-over valve 350 in the position shown, actuator ram 360 is moved to the right with a double-acting stepping motion. By rotating valve 350 through a half-circle, actuator ram 360 would be moved to the left under the influence of supply pressure at line 301. By moving cross-over valve 350 to a central position and thereby blocking ports 352 and 353, while simultaneously operating valve 300 to port supply pressure through lines 303 and 305, actuator ram 360 may be locked in any desired position.

It is apparent that the configuration of FIGURE 8 could be substantially simplified by using a cross-over valve of the type shown in FIGURES 1 and 5. In that event, valve 300, flexible lines 303 and 305 and the corresponding braking-ports in elements 324 and 326, and valve 350, could all be replaced by the cross-over valve. Rigid air supply line 301 would then be directly connected to the cross-over valve, in the manner shown in FIGURE 5, and the flapper-valve and piston-brakes would be controlled by the single spool-type cross-over valve.

Figure 9:
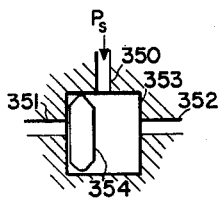
FIGURE 9 is an enlarged view of a typical flapper valve suitable for use in the actuators of FIGURES 1, 2, 5, and 8.
Figure 10:
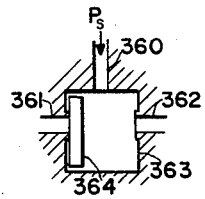
FIGURE 10 is an enlarged view of an alternate flapper valve for use in the actuators of FIGURES 1, 2, 5, and 8.

FIGURES 9 and 10 are enlarged views of possible flapper-valve configurations. In FIGURE 9, supply pressure at line 350 is ported to line 351 when flapper 354 is to the right of chamber 353, and is ported to line 352 when the flapper 354 is to the left of chamber 353 as shown. Positive operation of flapper 354 is achieved by machining the corners as shown to provide a generally triangular construction at each end, thereby minimizing the area of the flapper that actually engages the side wall of the flapper chamber 353. I have found that this arrangement causes positive flapper action to occur at less differential pressure than would otherwise be required.

In FIGURE 10, I achieve the same result as shown in FIGURE 9 by forming chamber 363 with shoulders adjacent to passages 361 and 362, whereby flapper 364 is prevented from engaging the side wall of the chamber 363 along its entire length.

In FIGURES 11 through 13 I have shown a pneumatically operated cross-over valve that could be used to replace the cross-over valve 231 in FIGURE 2, and which could also be adapted to replace valve 350 shown in FIGURE 8. This pneumatically controlled cross-over valve consists of a valve body 400 which is formed with an integral flange 401 around port 402 as shown. In FIGURE 12, which is a section through AA in FIGURE 11, shows the valve body mounted in the actuator body, which in this case has been numbered 211 to correspond with the actuator body of FIGURE 2. Valve body 211, in this case, is formed with 3 additional air pasages that are not shown in FIGURE 2, these being numbered 403, 404 and 405. By directing pressure through passage 403, with passages 404 and 405 open and closed, respectively, flange 401 is forced counter-clockwise until it engages actuator body 211, at which point passage 404 is closed by flange 401. On the other hand, if pressure is supported through passage 404 with passage 403 open and passage 405 closed, shoulder 401 is forced clockwise until passage 403 is closed. Thus, it is apparent that rotation of the flange and cross-over valve body through 180° is provided. The third position is achieved by porting pressure through passages 403 and 404 simultaneously, with passage 405 open, in which case the flange 401 is moved to the position shown in FIGURE 12 and air is exhausted at either side thereof.

FIGURE 13 is a view through section BB of the cross-over valve shown in FIGURE 11, with the valve body 400 mounted in actuator body 211 and pressure in passage 403, passage 405 being closed and passage 404 being open. Thus, flange 401 is forced counterclockwise (FIGURE 12) until port 404 is closed, resulting in the cross-sectional view as shown in FIGURE 13. In this figure, passages 227, 230, 240, and 241 are taken directly from FIGURE 2, and it is apparent that rotation of the cross-over valve through a half circle will reverse the port connections shown. Thus, a pneumatically controlled cross-over valve configuration is shown.

In FIGURE 14, I have shown an enlarged view of a control valve of the type suitable for use as valve 301 or valve 300 in FIGURE 2 and 8, respectively. A portion of the valve body 410 is shown, this body being provided with passages 411, 412, 414, and 415, a sleeve for shaft 416, and an internal opening or chamber 413. Supply pressure is received in passage 411, and passage 412 is connected to the flapper valve, and it is therefore obvious that this valve is shown in condition for causing operation of the pneumatic actuating mechanism to which it is attached. Passages 414 and 415 are connected to the two piston-brakes as shown in FIGURE 8, or one of these ports may be blocked with the other connected to the actuator base and piston-brake as shown in FIGURE 2. Shaft 416 is operatively connected to a solenoid (not shown), with the solenoid energized to hold element 417 against passages 415 and 414 as shown. Shaft 416 is spring loaded so as to normally hold element 417 against passage 412, so that supply presure will normally be effective to apply braking pressure to the piston-brakes, while preventing air from being supplied to the flapper valve. It should be noted that shaft 416 is provided with a reduced diameter section, and that element 417 is reduced in thickness around the center opening. This loose connection assures positive blocking of passages 414 and 415, regardless of slight irregularities in the left wall surface of chamber 413. In addition, this feature aids in the initial movement of element 417, since shaft 416 will develop a small amount of inertia before element 417 is moved.

Figure 15:
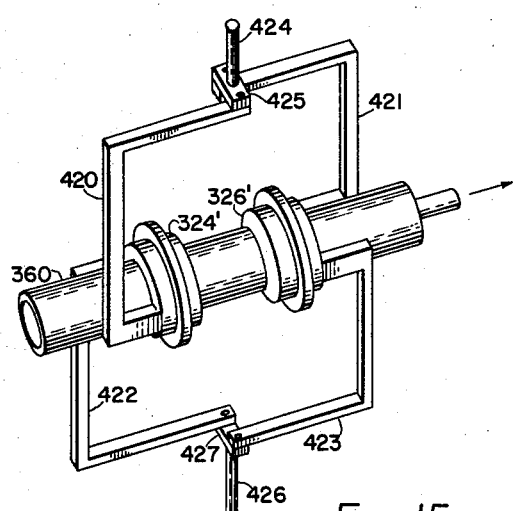
FIGURE 15 is an alternate configuration of the rack-and-pinion gear structure for use with the actuator of FIGURE 8.

In FIGURE 15, I have shown a portion of the actuator mechanism of FIGURE 8, including actuator ram 360 and the two piston-brakes, the remaining portion of the FIGURE 8 mechanism being removed to prevent a clearer picture of this modification. The piston-brakes have been modified, however, by eliminating the rack-and pinion assemblies 325 and 336 shown in FIGURE 8, in favor of the linkages shown in FIGURE 8. Thus, the two brakes are identical as items 324' and 326'. It should be noted that the linkages shown in FIGURE 15 would extend completely around actuator body 311 shown in FIGURE 8, these linkages being therefore external to the overall actuator mechanism. L-shaped bars 420 and 422 are formed as an integral part of piston-brake 324' as shown, and positioned at opposite sides thereof. L-shaped bars 421 and 423, which are identical to bars 420 and 422, are formed as an integral part of piston-brake 326' and positioned at opposite sides thereof as shown. These L-shaped members are mechanically linked at one or more points by bars such as 425 and 427, loose pins being provided at the connection points to facilitate rotation. Bars 425 and 427 are provided with shafts 424 and 426, respectively, these shafts being pivotally mounted to bars 425 and 427, but securely attached at their outer ends. Thus, as piston-brake 324' is moved to the right with respect to actuator ram 360, force is applied to bars 425 and 427 by bell shaped members 420 and 422, respectively, thereby rotating bars 425 and 427 about shafts 424 and 426, respectively. This rotation causes bars 421 and 423 to be pulled to the left, thereby supplying an additional force to piston-brake 326 so as to move said piston-brake 326 and actuator ram 360 to the left. During the alternate half cycle, when the braking element of piston-brake 324' is operative, piston-brake 326' moves to the right with respect to actuator-ram 360, and aids in forcing piston-brake 324' and actuator ram 360 to the left. Thus, it is apparent that the linkages shown in FIGURE 15 provide an identical function to the idler-gear assemblies shown in FIGURES 2, 5, and 8. The arrangement of FIGURE 15 is more desirable, however, since it makes possible the use of a more positive connecting link, and locates this more positive link at a point where it is easily excessible for maintenance and repair. In addition, several links could be provided in parallel, thereby distributing the actuating force over a number of links.

Figure 16:
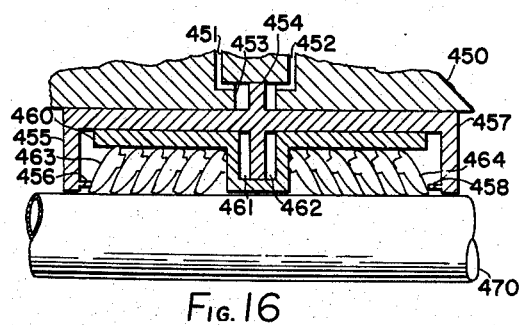
FIGURE 16 is an alternate braking arrangement for use on any of the actuators shown in FIGURES 1, 2, 5, and 8.

For some applications, it may be desirable to use a mechanical braking device, rather than a pneumatically operated braking device as described above. A mechanical braking mechanism suitable for such use in shown in FIGURE 16. In FIGURE 16, although only a partial cross-sectional view of the braking mechanism and structure is shown, it should be understood that this braking mechanism extends around the entire periphery of actuator-ram 470. Circular groove 453, which extends around the inner wall of actuator body 450, is pressurized through air passage 451 in order to drive piston 454 to the right, and is pressurized through passage 452 in order to drive piston 454 to the left. Piston 454 is formed with annular arms 455 and 457 extending therefrom, said arms being formed with flanges 456 and 458 as shown.

Annular member 460, which extends around actuator-ram 470, provides the necessary reversing function for the braking mechanism. The U shaped section at the center of member 460 receives the lower portion of piston 454, and is ported at chambers 461 and 462 (not shown), these ports being connected to a suitable cross-over valve in order to move the right wall of chamber 462 against piston 454 or to move the left wall of chamber 461 against piston 454, depending upon the desired direction of movement. Two groups of shaped rings such as 463 and 464 provide the braking action. With the piston centered as shown, rings 463 and 464 ride easily along the surface of actuator-ram 470, and therefore provide no braking action. However, when chamber 461 receives pressure from the cross-over valve, causing annular member 460 to move to the left, flange 456 on arm 455 bears against the bottom of the left hand ring of the group of rings 463, and this force is transmitted from ring to ring so as to bring each of them into firm contact with actuator-ram 470. Thereafter, when piston 454 is moved to the right, under the influence of pressure received through passage 451, there is no restraining force imposed by elements 463 since the direction of movement is such as to cause them to slide easily over the ram. However, if port 452 receives pressure, thereby forcing piston 454 to the left, this forces in a direction which tends to rotate elements 463 onto their longer axes, and thereby positively forces elements 463 into engagement with actuator-ram 470, causing the ram to move to the left along with the braking mechanism and piston. The action of this braking mechanism is reversed by porting air into chamber 462 and forcing annular member 460 to the right, whereafter movement of piston 454 to the right carries actuator-ram 470 to the right under the influence of rings 464. Thus, it is apparent, that use of a two section mechanical braking configuration as shown, and by alternately operating these brakes as in the case of the pneumatic brakes shown in FIGURES 2, 5, and 8, a double acting motion can be imparted to actuator-ram 470 so as to move it in either direction.

The various configurations shown and described above are considered to be the preferred embodiments of my invention, but it should be understood that numerous changes in modifications thereof could be made without departing from the spirit and scope of the invention as defined in the appended claims.

I claim:

1. A stepping type pneumatic motor, comprising: a longitudinally movable output member of cylindrical design; a longitudinally movable cylinder having a circular flange radially formed thereon; pneumatically operated clutch means for controlling the relative movement between said cylinder and output member; and valve means including a flapper-valve chamber having a flapper member located therein, an inlet line connecting said flapper-valve chamber to a source of pressurized air, and lines individually connecting a pair of exhaust ports in said chamber to said clutch means and to opposite sides of said flange, said flapper member being operative to alternately block said exhaust ports to thereby control application of said pressurized air to said clutch means and to the sides of said flange whereby to operate said cylinder through repeated short-stroke movements while simultaneously operating said clutch means, thereby causing long displacement of said output member.

2. A stepping type pneumatic motor as claimed in claim 1, comprising: a second valve means for reversing said individually connecting lines to thereby cause said long displacement in a reverse longitudinal direction.

3. A stepping type motor, comprising: a longitudinally movable output means operable through a predetermined range; linearly operable means having a portion with opposed sides alternately receiving opposed pressures for controlling the motion of said output means; valving means responsive to two relative positions of said portion and output means for alternately directing pressurized fluid to the opposite sides of said portion; clutch means engageable with the output means or portion; and means including said valving means for engaging said clutch means in synchronism with the alternate pressurizations of said portion, to drive said output means through said range in incremental steps.

4. A stepping type motor, comprising: a longitudinally movable output means capable of having a relatively long displacement; linearly operable means for controlling the displacement of said output means and having a portion responsive cyclically to opposed pressures; valving means for alternately directing pressurized fluid against one side of said portion to move said output means through a relatively short displacement, and against the other side of said portion to achieve the repositioning of the linearly operable means; fluid controlled clutch means for preventing reverse movement of said output means; and means including said valving means effective near the end of the short displacement for engaging said clutch during said repositioning.

5. A stepping type motor as claimed in claim 4, wherein said clutch engaging means comprises a reversible valve, operation thereof being effective to cause said repositioning when said fluid is directed against said one side of said portion, and to cause said short displacement when said fluid is directed against said other side of said portion, whereby the direction of longitudinal stepping movements of the output means and portion are relatively reverse.

6. A stepping type motor as claimed in claim 5, wherein a second reversible valve is provided with a neutral position, and mean effective upon operation of said reversible valve to said neutral position for causing the continuous energization of said clutch means.

7. A fluid motor comprising longitudinally movable means, a double acting linear short stroke interconnected fluid actuating means, a pair of fluid operated clutch means connected to the actuating means and engageable on operation with said movable means, two position valving means, further means operable at the end of each stroke moving the valving means from one position to the other to cause double acting operation of said short stroke actuating means and simultaneously causing alternate operation of said clutch means.

8. A stepping type pneumatic actuator, comprising: a longitudinally driven member; a pair of fluid controlled, short-stroke reversible pistons; fluid controlled first clutch means for connecting one of said pistons to said member; fluid controlled second clutch means for connecting the other of said pistons to said member, said clutch means being controlled alternately; and valving means for directing a source of pressure fluid to longitudinally drive said pistons through reciprocating short-stroke movements and for alternately controlling and thus alternately connecting said first and second clutch means whereby a long displacement is imparted to said member.

9. A stepping type pneumatic actuator as claimed in claim 8, wherein each of said clutch-means consists of a relatively thin sleeve positioned to provide a sliding fit with said member, and a relatively thick cylindrical housing surrounding said sleeve and connected around the outer edges thereof so as to define an enclosed chamber therewith, pressurization of said enclosed chamber being effective to deform said relatively thin member into a tight-friction fit with said output means.

10. A stepping type pneumatic actuator as claimed in claim 8 comprising means for mechanically connecting said pistons for synchronizing the movements thereof and for transmitting force from the non-connected piston to the connected piston to thereby effectively increase the force available to each incremental movement of said member.

11. A stepping type pneumatic actuator as claimed in claim 8, wherein said valving means includes a flapper valve having an inlet port and a pair of exhaust ports, the flapper therein being effective to alternately close said exhaust ports, each of said exhaust ports being connected to said pistons and one of said clutch means.

12. A stepping type pneumatic actuator as claimed in claim 11 wherein each of said pistons is provided with exhaust ports that are alternately opened to the atmosphere when said pistons reach the ends of said short stroke movements, said opening being effective to cause a sudden pressure change across said flapper and a sudden increase of air flow past said flapper, said pressure change and air-flow increase being effective to switch said flapper from one of said exhaust ports to the other.

13. A stepping type pneumatic actuator as claimed in claim 11, wherein said valving means additionally includes a reversing valve for reversibly connecting said exhaust ports to said clutch means to thereby enable the reversal of said long-stroke incremental movement.

14. A stepping type pneumatic actuator as claimed in claim 13, wherein said reversing valve is effective in a neutral position to simultaneously connect said exhaust ports to both said clutch means thereby simultaneously connecting both said pistons to said member to prevent movement of said member.

15. A stepping type pneumatic actuator as claimed in claim 13, additionally comprising a two position control valve, effective in one position to connect a source of pressurized air to said inlet port of said flapper valve and in the other position to connect said source to said clutch means to prevent movement of said member.

16. A fluid motor comprising a longitudinally movable output means receiving a relatively long displacement, cylinder means, two interconnected piston means alternately effectively operable within said cylinder means with a relatively short stroke, intermittently energizable first clutch means for connecting or engaging one said piston means to said movable means for transmitting piston motion to said movable means while applying opposite motion to the other piston means, second intermittently energizable clutch means between said other piston means and output means for additionally controlling motion of said movable means, fluid supply means including two position valve means for alternately supplying pressure fluid to said cylinder and piston means and alternately operating said first and second clutch means to engaging position, and means responsive at the end of each stroke moving the valve means from one position to the other.

17. A stepping type motor having a longitudinally movable output means operable through a predetermined range, two actuating means each operable through only a portion of said range, two controllable clutch means providing a separate clutch means for each actuating means for connecting said actuating means to said output means, and means controlled by and effective during operation of either of said actuating means for simultaneously effecting the operating of said other actuating means and said other clutch means and terminating its own operation.

18. A fluid motor comprising movable means, a pair of pistons, a cylinder cooperating with each of said pistons to provide a pair of chambers to thereby provide double acting actuating means, a pair of clutch means engageable with said movable means, at least one of said clutch means being connected to each piston, means for supplying pressure fluid to said chambers and to both said clutch means, and a two position valving means cooperating with said supplying means for simultaneously directing pressure fluid to one of said chambers and one of said clutch means while in one position and then to the other of said chambers and the other of said clutch means when in the other position, and means controlled by either piston during motion thereof causing displacement of the valving means to the other position.

19. A stepping type pneumatic motor, comprising: a longitudinally movable output member receiving a relatively long displacement; piston means having a relatively short forward and reverse stroke for controlling said output member; two position valving means controlled by displacement of the piston means in each stroke for alternately and repeatedly directing pressurized air to opposite sides of said piston means; and clutch means controlled by said valving means and alternately holding said output member or piston means to enable movement of said output member in one direction responsive to said directing of pressurized air to one side of said piston, and to prevent movement of said output means when the pressurized air is directed to the other side of said piston, whereby the repeated short stroke piston movements are effective to cause a long displacement of said output member in said one direction.

20. A stepping type pneumatic motor as claimed in claim 19 additionally comprising means for reversing the operation of said clutch means, thereby reversing the longitudinal movement of said output member so as to cause movement thereof in a reverse direction.

21. A stepping type pneumatic motor as claimed in claim 19 wherein said valving means comprises a valve-chamber having an inlet port and two outlet ports, and a free-moving disk shaped flapper-member arranged to alternately close said output ports responsive to said piston means reaching the end of said short stroke movements.

22. A stepping type pneumatic motor as claimed in claim 21, additionally comprising a pair of exhaust ports alternately opened as said piston means approaches each end of said relatively short stroke movement thereby reducing the pressure in said valve chamber and increasing the flow of air through the open one of said flapper chamber exhaust ports, so as to create a differential pressure across said flapper-member and move said flapper-member to said alternate position.

23. A stepping type pneumatic motor, comprising: a longitudinally movable output member of cylindrical design, said member having a circular groove near one end thereof, a valve chamber with an inlet port at one end thereof and a pair of exhaust ports on opposite sides thereof, a first control port connecting the outer surface of said member with one corner of said circular groove and one of said exhaust ports, and a second control port connecting the outer surface of said member to the other corner of said circular groove and the other exhaust port; a tubular, longitudinally movable piston adapted to receive said member with a tight, sliding fit, and provided with a circular flange depending from the inner wall thereof that has a width equal to the depth of said circular groove; first pneumatically controlled clutch-means for locking said member against longitudinal movement; second pneumatically controlled clutch means for locking said piston-means against longitudinal motion; first valving means for connecting a source of air pressure to said inlet port and for reversibly connecting said first and second control ports to said first and second clutch-means; and second valving means mounted in said valve chamber, and alternately and repeatedly direct said air pressure to said first and second control ports, thereby directing said pressure to said groove at alternate sides of said flange to cause reciprocating relative motion between said output member and said piston means, said clutch means being thereby alternately engaged to hold one or the other of said output member and piston means to thereby cause a long stroke movement of both of said longitudinally movable members by means of a plurality of short-stride-incremental steps.

24. A stepping type pneumatic actuator, comprising: a tube-shaped longitudinally movable output member movable through a relatively long change in position; a stationary cylindrical support member adapted to fit inside of said tubular output member, and having a pair of circular grooves formed therein; a pair of tubular braking members each having a circular flange depending from the inner wall thereof and positioned adjacent said grooves with said flange located therein, and engaging the inner wall of said output means and the outer wall of said support means with a close, sliding fit; a flapper-valve formed in said support member and having an inlet port connected to one end thereof and pair of exhaust ports connected to opposite sides thereof; a reversing valve mounted in said support member; a first control line connecting one of said exhaust ports, said reversing valve, and the adjacent walls of said circular grooves; a second control line connecting said second exhaust port, said reversing valve, and the opposite walls of said circular grooves; a pair of braking lines in said support member for reversibly connecting said brakes to said first and second control ports in accordance with the position of said reversing valve; and a free-moving flapper in said flapper-valve chamber for alternately closing said exhaust ports, thereby repeatedly driving said piston-brakes longitudinally through a reciprocating short stroke movement controlled by the longitudinal length of said circular grooves, the alternate energization of the braking portion of said piston brakes being effective to carry said output means through said long change in position.

25. A stepping type pneumatic actuator, comprising: a tube-shaped longitudinally movable output member movable through a relatively long stroke; a stationary cylindrical support member adapted to fit inside of said tubular output member, and being formed with a pair of circular grooves to receive said flanges; a pair of spaced-apart tubular braking members each having a circular flange depending from the inner wall thereof, and adapted to engage the inner wall of said output member with a close, sliding fit; a flapper-valve chamber having an inlet port connected to one end thereof and a pair of exhaust ports connect to opposite sides thereof; a first control port connecting one of said exhaust ports to one of said braking members and the adjacent walls of said circular grooves and a second control port connecting said second exhaust port to the other braking member and the opposite walls of said circular grooves; a source of pressurized air connected to said inlet port; and a free-moving flapper in said flapper-valve chamber for alternately and repeatedly directing said air to said exhaust ports, there by repeatedly driving said brakes longitudinally through a reciprocating short stroke movement controlled by the longitudinal length of said circular grooves, the alternate energization of said brakes being effective to carry said output means through said long-stroke movement.

26. A stepping type motor comprising: a longitudinally movable output means operable through a relatively long range; a support member having a center bore somewhat larger than the diameter of said output means and positioned to surround a portion of said output means, said support means having a pair of spaced-apart circular grooves formed in the inner wall thereof; a pair of longitudinally movable piston-brake members each having the form of a tubular sleeve with a circular flange extending from the outer edge thereof, positioned adjacent one another with said flanges in said grooves so as to engage the outer surface of said output means and the inner surface of said support means with a tight, sliding fit; a reversing valve; a flapper-valve having an inlet port at one end and a pair of exhaust ports on opposite sides thereof; first porting means connecting one of said exhaust ports to said reversing valve and the adjacent sides of said circular grooves, pressurization of said first porting means being effective to direct pressure against adjacent sides of said flanges to thereby drive said piston-brake members away from each other through a short stroke movement controlled by the longitudinal length of said grooves; second porting means connecting the other of said exhaust ports to said reversing valve and the opposite sides of said circular grooves, pressurization of said second porting means being effective to direct pressure against the opposite sides of said flanges to thereby drive said piston-brake members toward each other; third porting means connecting said reversing valve to the braking portion of a piston-brake member, pressurization thereof being effective to connect said piston-brake member to said output means; fourth porting means connecting said reversing valve to the brake-portion of the other of said piston-brake members, pressurization thereof being effective to connect said other piston-brake member to said output means; a free-flapper member mounted in said flapper-valve chamber and operative to alternately close said exhaust ports responsive to said piston-braking members reaching the ends of said short-stroke movements, thereby moving said output means under the influence of said alternately connected piston-brake members to move said output means with double-acting motion through said relatively long range in a longitudinal direction determined by the reversing valve.

27. A stepping type motor comprising: a longitudinally movable output means operable through a relatively long range; a pair of longitudinally movable piston-brake members each having the form of a tubular sleeve with a circular flange extending from the outer edge thereof; and positioned so as to engage the outer surface of said output means with a tight, sliding fit; said members being connected to said output means responsive to the operation of the braking portion thereof; a support member having a center bore somewhat larger than the diameter of said output means and positioned to surround a portion of said output means, said support means having a pair of spaced-apart circular grooves formed in the inner wall thereof and adapted to receive said flanges to thereby define a pair of short stroke pistons therewith, a flapper-valve chamber having an inlet port at one end and a pair of exhaust ports on opposite sides, first porting means connecting one of said exhaust ports to one of said piston-brake members and the adjacent sides of said circular grooves, and second porting means connecting the other of said exhaust ports to the other of said piston-brake members and the opposite sides of said circular grooves; and a free-flapper member in said flapper-valve chamber operative responsive to pressurized fluid received in said inlet port to alternately close said exhaust ports responsive to said piston-braking members reaching the ends of their short-stroke movement; thereby moving said output means under the influence of the alternately operated braking portion of said piston-brake members to thereby move said output means through said relatively long range.

28. A stepping type fluid motor having a movable output means operable through a predetermined range, actuating means operable through only a portion of said range, a first operable brake for the output means, a second operable brake for the actuating means, a motor interconecting said actuating means and output means to effect relative displacement thereof in two directions, and means for cyclically energizing one brake and the motor to effect relative displacement of the actuating means and output means in one direction and energizing said other brake and reversely energizing the motor the other brake is unenergized to effect reverse relative displacement thereof during the operation through said portion until the output means traverses a predetermined range.

References Cited in the file of this patent

UNITED STATES PATENTS

| 1,117,516 | Petrie | Nov. 7, 1914 |
| 2,657,009 | Neis et al. | Oct. 27, 1953 |
| 2,657,046 | Tallis | Oct. 27, 1953 |
| 2,775,869 | Pointer | Jan. 1, 1957 |
| 2,858,105 | Lucas | Oct. 28, 1958 |
| 2,873,580 | Suderow | Feb. 17, 1959 |

FOREIGN PATENTS

| 78,827 | Denmark | Feb. 7, 1955 |
| 1,117,999 | France | Mar. 5, 1956 |